United States Patent
Kisko

(10) Patent No.: US 7,667,903 B2
(45) Date of Patent: Feb. 23, 2010

(54) RETRACTABLY MOUNTED MAGNIFYING GLASS ASSEMBLY

(76) Inventor: Mary Kisko, 2413 Village Green Ct., Toms River, NJ (US) 08753

( * ) Notice: Subject to any disclaimer, the term of this patent is extended or adjusted under 35 U.S.C. 154(b) by 0 days.

(21) Appl. No.: 12/378,395

(22) Filed: Feb. 13, 2009

(65) Prior Publication Data

US 2009/0213477 A1    Aug. 27, 2009

Related U.S. Application Data

(60) Provisional application No. 61/066,450, filed on Feb. 21, 2008.

(51) Int. Cl.
*G02B 27/02* (2006.01)
(52) U.S. Cl. ...................................... 359/802
(58) Field of Classification Search ................. 359/802
See application file for complete search history.

(56) References Cited

U.S. PATENT DOCUMENTS

| | | | | |
|---|---|---|---|---|
| 6,982,840 B1 * | 1/2006 | Schlief | .................... | 359/802 |
| 7,277,241 B1 * | 10/2007 | Fulton | .................... | 359/805 |
| 7,304,809 B1 * | 12/2007 | Budacz | .................... | 359/802 |
| 7,471,467 B1 * | 12/2008 | Kalwa et al. | ................ | 359/802 |

* cited by examiner

*Primary Examiner*—Jessica T Stultz
*Assistant Examiner*—Mahidere S Sahle
(74) *Attorney, Agent, or Firm*—Clifford G. Frayne

(57) ABSTRACT

A magnifying glass having a frame with gripping means, the frame forming the periphery of a magnifying glass formed of a clear plastic polycarbonate, the frame having an attachment member for attachment of a biased, retractable, flexible cord, which flexible, retractable cord is biasly secured to and stored within a mount member, the mount member affixable to any flat surface, the mount member having a securing member for securing the magnifying glass to the mount when not in use, the magnifying glass selectively removable from the mount member and transportable for a distance equal to the length of the flexible, retractable cord stored in the mount member, the return of the magnifying glass to the mount member, causing slack in the flexible, retractable cord, such that it is rewound or retracted within the mount member.

6 Claims, 3 Drawing Sheets

RETRACTABLY MOUNTED MAGNIFYING GLASS ASSEMBLY

RELATED APPLICATIONS

Applicant claims the benefit of provisional application Ser. No. 61/066,450, filed Feb. 21, 2008.

BACKGROUND OF THE INVENTION

1. Field of the Invention

The present invention relates to optical instruments and more particularly, to a magnifying glass and mounting member assembly in which the magnifying glass and mounted member are secured together by means of a retractable, flexible cord thereby allowing use of the magnifying glass over a certain range of distance, but allowing the magnifying glass to be stored on the mounting member with the flexible, retractable cord stored within the mounting member attached to a suitable surface.

2. Description of the Prior Art

There are three primary means of enhancing an individual's vision, glasses or optical lenses, contact lenses, and/or laser surgery. Of the three, glasses and contact lenses are the most prevalent in society for correcting or aiding individual's with their visual acuity.

Not all individuals require glasses for all circumstances. Many individuals require glasses or contact lenses only for reading in that their distance vision is unaffected. A great many people require glasses for both reading and for distance, and of these individuals, some individuals choose to utilize a bifocal optical lens, while others prefer to utilize two pairs of glasses, one for reading and close up work, and one for distance.

There is a certain amount of vanity with the individual who must wear glasses for a specific purpose. Those individuals whose eyesight is seriously defective, and require the wearing of glasses at all times, realize the shortcomings of their visual acuity and wear the glasses. However, those individuals who require glasses for only reading or close work will not wear the glasses otherwise, and will place them at a location which should allow them access if they remember where they placed the glasses.

However, with the baby boomers coming of retirement age, a great many individuals need to supplement their visual acuity in certain instances. One example would be in the kitchen where an individual is required to read a recipe from a cook book, or a recipe from a food package in which the printing was very small and the amount of light may not be optimal. A still further instance is with respect to the taking of medications and the reading of the labels to determine that the individual has the correct medication and knows the correct dosage. In these instances, a visual enhancer in the form of a magnifying glass would be very helpful whether or not the individual required the use of glasses or contact lenses or no visual enhancement. Many people resort to the use of a magnifying glass in these instances, however, the problem is that the magnifying glass has a tendency to migrate from drawer to drawer in a house where multi individuals dwell. Therefore it is not always available at the location and at the time that it is needed by an individual.

Applicant's mounting device with retractable magnifying glass assembly addresses this problem by allowing an individual to mount the retractable magnifying glass to a wall, cabinet, refrigerator, or other suitable available surface. A retractable cord is stored within the mounting member and is attached to a magnifying glass removably secured to the mounting member. The individual could mount this retractable magnifying glass at a convenient location in the kitchen, bathroom, or any other desired room, such that the individual would know exactly where the magnifying glass was at any time. The retractable flexible cord allows the user to selectively remove the magnifying glass from the mount and to walk or carry the magnifying glass the maximum distance away from the mount equal to the amount of retractable, flexible cord secured therein, such that the individual could cross the kitchen to another countertop to read a recipe or a prescription, and then return the magnifying glass to the mount with the retractable, flexible cord being automatically returned to the interior of the mount by a biased cam mechanism.

OBJECTS OF THE INVENTION

An object of the present invention is to provide for a novel magnifying glass retractably securable to a mount by means of a retractable, flexible cord.

Another object of the present invention is to provide for a novel magnifying glass and mount, wherein the mount is positioned at a convenient location for the individual and the magnifying glass by means of the retractable cord is stored on the mount and cannot be misplaced or mislaid, thereby insuring the user repeated access to the magnifying glass when needed.

A still further object of the present invention is to provide for a novel magnifying glass and mount with retractable cord in which the cord is of sufficient length to allow the user to move about the room utilizing the magnifying glass.

A still further object of the present invention is to provide for a novel magnifying glass and mount in which the magnifying glass is formed from shatter proof polycarbonate plastic.

A still further object of the present invention is to provide for a novel magnifying glass and mount in which the magnifying glass is easily secured to the mount when not in use and easily released from the mount when required.

SUMMARY OF THE INVENTION

A magnifying glass having a frame with gripping means, the frame forming the periphery of a magnifying glass formed of a clear plastic polycarbonate, the frame having an attachment member for attachment of a biased, retractable, flexible cord, which flexible, retractable cord is biasly secured to and stored within a mount member, the mount member affixable to any flat surface, the mount member having a securing member for securing the magnifying glass to the mount when not in use, the magnifying glass selectively removable from the mount member and transportable for a distance equal to the length of the flexible, retractable cord stored in the mount member, the return of the magnifying glass to the mount member, causing slack in the flexible, retractable cord, such that it is rewound or retracted within the mount member.

BRIEF DESCRIPTION OF THE DRAWINGS

These and other objects of the present invention will become apparent, particularly when taken in light of the following illustrations wherein.

DETAILED DESCRIPTION OF THE INVENTION

The Applicant's invention is a semi-permanently mounted assembly consisting of a magnifying glass attached to a mounting unit by means of a flexible cord which, preferably, is retractable with respect to the mounting unit. The mounting unit can be secured to a wall, cabinet, refrigerator, or other suitable, convenient surface in any room in the home, a workshop or other desired location, using a magnet, adhesive, screws or other fasteners. In a preferred configuration, a flexible, retractable cord is attached at one end within the mounting of the invention and is attached at the other end to a magnifying glass that is removably secured to the respective mounting unit when the magnifying glass is not in use. The retractable flexible cord allows the user to selectively remove the magnifying glass from the mount and to carry the magnifying glass the maximum distance away from the mount as determined by the length of said cord to which the magnifying glass is attached. Given sufficient length of said retractable cord, an individual could cross the kitchen to another countertop to read a recipe or other small print, and then return the magnifying glass to the mount as said cord is automatically retracted to the interior of the mounted unit by a biased cam mechanism.

Figure 1:
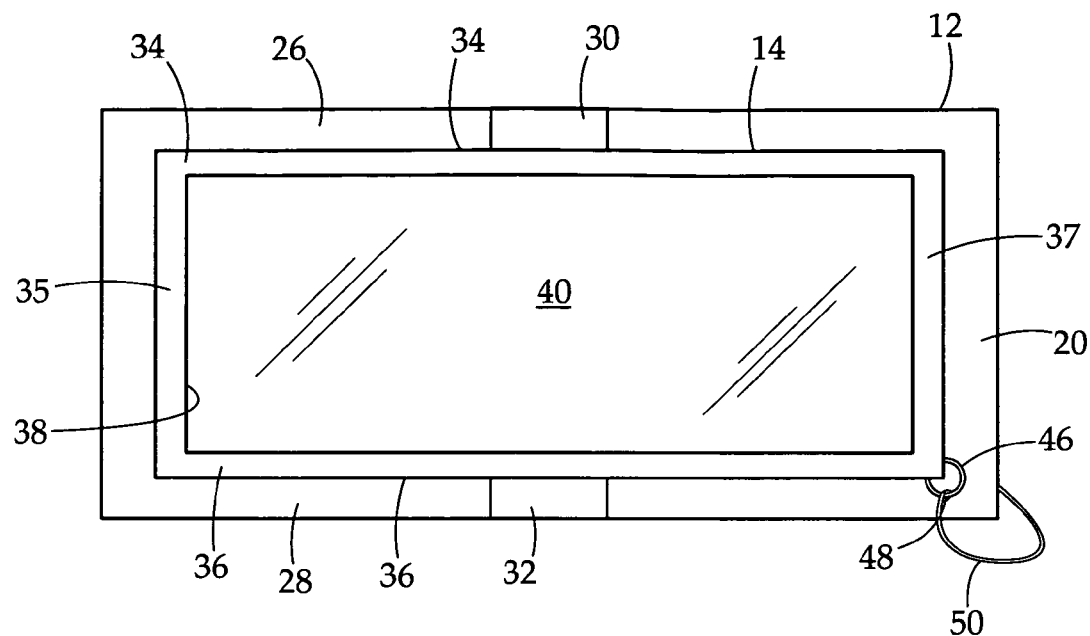
FIG. 1 is a front planar view of a retractably mounted magnifying glass of the present invention illustrating one embodiment thereof.
Figure 2:
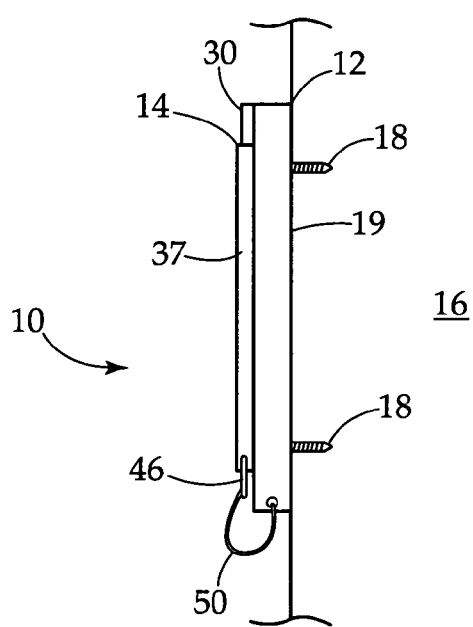
FIG. 2 is a side view of the retractably mounted magnifying glass of FIG. 1.

Referring to FIG. 1, there is a front planar view of the retractably mounted magnifying glass assembly 10 and FIG. 2 is a side view of the retractably mounted magnifying glass assembly 10. FIGS. 1 and 2 illustrate one embodiment of the manner in which the assembly 10 can be mounted and the manner in which the retractably mounted magnifying glass 14 and mount member 12 may be engageable. It will be recognized by those of ordinary skill in the art that there are additional embodiments which may be utilized in order to mount the retractably mounted magnifying glass assembly 10 to a surface and additional embodiments of the manner in which the retractably mounted magnifying glass 14 is secured to a mount member 12.

The retractably mounted magnifying glass assembly 10 comprises a mount member 12 which would be mounted to a suitable surface 16 by suitable fastening means 18. Mount member 12 as illustrated in FIG. 1 is generally rectangular in shape in order to conform to the shape of the magnifying glass 14. Mount member 12 comprises a planar rear face 19 for engagement and attachment to a suitable surface 16 by means of a fastening means 18. Front face 20 of mounting member 12 is generally planar having a planar indent 22 (See FIG. 3) defined by an upstanding peripheral edge 24 (See FIG. 3). The recess 22 is generally planar and dimensioned to receive the magnifying glass 14. Positioned on opposing peripheral edges 26 and 28 of front face 20 of mount member 12 would be opposing frictional clips 30 and 32 which would frictionally engage opposing outer side walls 34 and 36 of magnifying glass 14 to retain magnifying glass 14 in position when not in use. The frictional clips 30 and 32 illustrated in FIG. 1 are shown on the horizontal peripheral edges of mount member 12, but could equally be positioned on the vertical peripheral edges of mount member 12. Still further a magnetic attraction between mount 12 and magnifying glass 14 could obviate clips 30 and 32.

Magnifying glass 14 as illustrated in FIGS. 1 and 2 is generally rectangular in shape having peripheral walls 34, 35, 36, and 37 defining an area 38 for receipt of a magnifying optic 40. Preferably the peripheral edge and magnifying optic 14 and 40 would be fabricated from a shatter-proof polycarbonate plastic. The dimensions of the outer peripheral walls 34, 35, 36, and 37 of the magnifying glass 14 are such that it fits within the planar indent 22 of the mounting member 12. The frictional clips 30 and 32 on the peripheral edges 26 and 28 of the mounting member 12 are positioned such that they would frictionally engage the outer peripheral walls 34 and 36 of the horizontal edges of magnifying glass 14.

Figure 3:
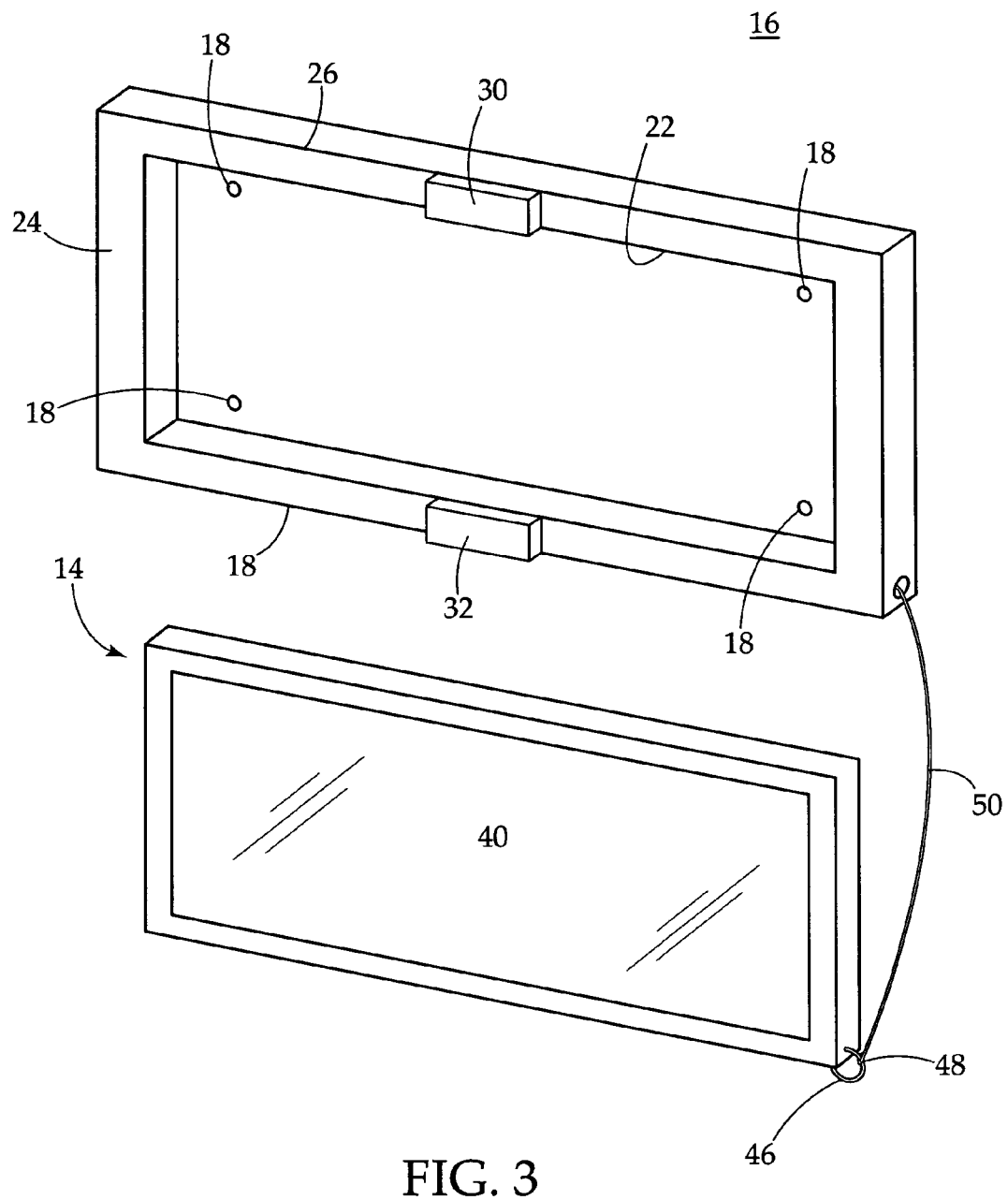
FIG. 3 is an exploded perspective view of the retractably mounted magnifying glass of FIG. 1 in a detached and usable orientation.

As illustrated in FIG. 3 the mounting member 12 could be secured to a suitable surface such as a wall surface by a plurality of threaded fasteners 18. Other fastening means could include adhesive, or possibly a magnet when securing the assembly to an appliance. The only limitation on the fastening means 18 is that it must be secure enough such that it maintains the mount member 12 in location when the magnifying glass 14 is removed and extended away from the mounting member as explained hereafter.

Magnifying glass 14 would have a securing aperture 46 either formed directly in its peripheral edges 34, 35, 36, and 37, or formed integrally with the peripheral edge as illustrated in FIG. 1 wherein the securing aperture consists of an integral unitarily formed loop 48 formed with the peripheral edge. Loop 48 is secured to the mounting member 12 by a flexible, retractable cord 50, which cord 50 is biasly stored on a reel within the mounting member 12 such that when the magnifying glass 14 is disengaged from the mounting member 12 and the frictional clips 30 and 32, the user may extend the flexible, retractable cord 50 the distance required to view the item or text or writing which the user desires to read or understand. If the user is standing directly in front of the retractably mounted magnifying glass assembly 10 with the item to be read, then the flexible, retractable cord 50 will only be fed out a short distance in order to read the text and then return the magnifying glass 14 to the mount member 12 with the cord 50 automatically being retracted by the biasing element within the mounting member 12. However, if the item to be read or discerned is several feet away, the user can detach the magnifying glass 14 from the mount member 12 and travel a distance, the maximum being equal to the length of retractable cord 50 within the mounting member in order to read or discern the object.

Figure 4:
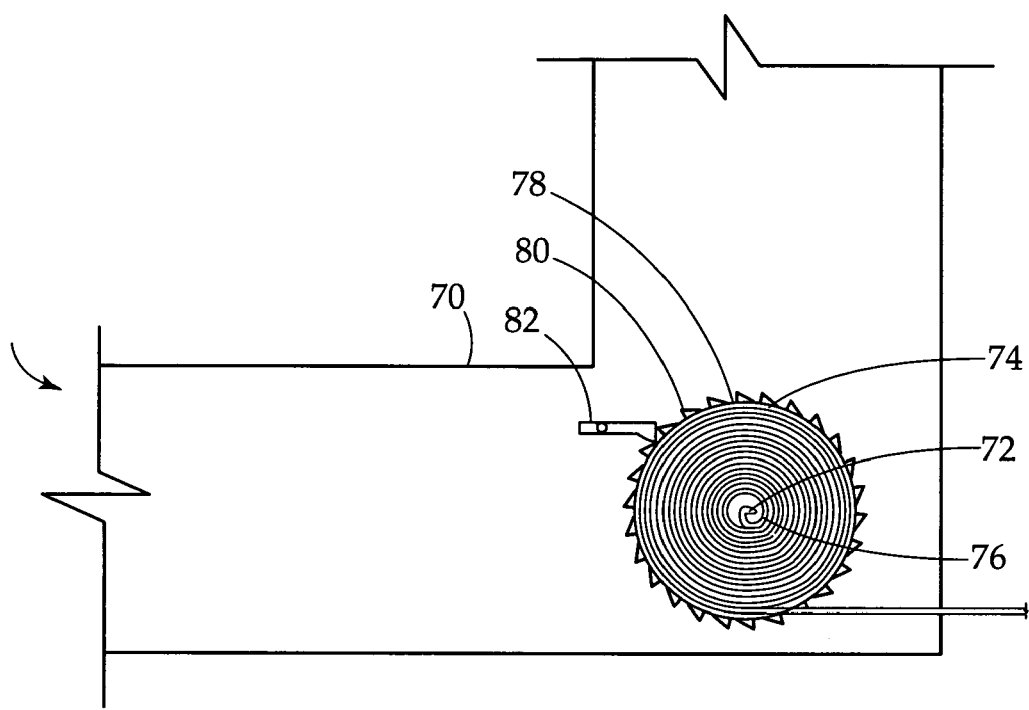
FIG. 4 is a cross-section along Plane 4-4 of FIG. 2 illustrating the biasing or rewind member.

FIG. 4 is a cross-sectional view of FIG. 2 along Plane 4-4 illustrating a possible embodiment of a real and biasing means within mount member 12. In this configuration, mount member 12 would be of two piece construction, which would include a rear wall 70 which would define a cavity within the mounting member 12 for positioning of the retractable cord 50 and a biasing means. As illustrated in FIG. 4, there is mounted within mounting member 12, a spindle 72 on which is mounted a rotor 74 onto which retractable cord 50 is coiled. The rotor is formed with a coil spring biasing means 76 in communication with rotor 74 and spindle 72 which compresses upon the play out of cord 50. The outer surface 78 of rotor 74 is formed with a plurality of grooves or teeth 80 which are engageable by a swivelly mounted stop member 82. In operation, as the cord 50 is played out, rotor 74 rotates allowing the play out of cord 50 thus compressing biasing coil spring 72. When the play out of the cord 50 is complete, rotor 74 is locked in position by stop member 82. The user when wishing to rewind or retract the cord 50 merely pulls the cord slightly to release stop member 82 and coil spring biasing member 76 releases tension causing the rotor to reverse its rotation and retract the cord within the mounting member 12.

It will be recognized by those of ordinary skill in the art that the flexible, retractable cord 50 and biasing member could also be incorporated into the magnifying glass, however, this option would unduly increase the weight of the magnifying glass and its dimensions such that it would become unwieldy. The preferred method would be to have the flexibly, retractable cord 50 biasly mounted on a reel within the mounting member 12.

In the embodiment illustrated, the magnifying glass 14 is positioned within the mounting member such that portions of its peripheral edges 34, 35, 36, and 37 will extend outwardly from the planar indent 22 of mounting member 12. In this configuration, an individual can easily grasp the magnifying glass 14 with their fingers, engaging the upper and lower horizontal peripheral edges and detaching the magnifying glass from the mounting member 12. However, the magnifying glass 14 could also have a unitary, integrally formed handle member, which would be integral with a peripheral edge of the magnifying glass 14 to assist the user in holding the magnifying glass.

Therefore, while the present invention has been disclosed with respect to the preferred embodiments thereof, it will be recognized by those of ordinary skill in the art that various changes and modifications can be made without departing from the spirit and scope of the invention. It is therefore manifestly intended that the invention be limited only by the claims and the equivalence thereof.

I claim:

1. A magnifying glass assembly comprising:
    a mounting frame defined by peripheral side walls defining a recessed cavity, said mounting frame securable to a surface;
    a magnifying glass having a peripheral side wall complimentary in dimension to be frictionally received within said recessed cavity of said mounting frame, said magnifying glass having an aperture for the securement of a retractable, flexible cord extending from said mounting frame; and
    a release and retraction mechanism positioned within said mounting frame allowing for the extension of said retractable, flexible cord from said mounting frame to permit mobility of said magnifying glass, said release and retraction mechanism allowing for the retraction of said flexible cord for storage and the frictional replacement of said magnifying glass in said recessed cavity of said mounting frame, wherein said release and retraction mechanism for said flexible cord comprises a spindle mounted rotor having a biasing means positioned between said spindle and said rotor, an exterior rotor surface, said exterior rotor surface having a plurality of teeth formed on an exterior surface thereof, said teeth engageable with a stop member for maintaining said rotor in a stationary position, said retraction of said flexible cord accomplished by release of said tension on said biasing means causing said stop member to disengage and said rotor to rotate in a reverse direction retracting said flexible cord.

2. The magnifying glass assembly in accordance with claim 1 wherein said magnifying glass is maintained in said recessed cavity of said mounting member by frictional engagement between said peripheral side walls of said magnifying glass and said peripheral side walls of said mounting member.

3. The magnifying glass assembly in accordance with claim 1 wherein said magnifying glass is disengaged from said mounting member by finger gripping opposing sides of said magnifying glass peripheral side walls.

4. The magnifying glass assembly in accordance with claim 1 wherein said magnifying glass lens is formed of shatter-proof polycarbonate.

5. The magnifying glass assembly in accordance with claim 1 wherein said retractable, flexible cord is selectively disengageable from said magnifying glass permitting use of said magnifying glass a distance greater than the length of said retractable, flexible cord maintained within said mounting member.

6. The magnifying glass assembly in accordance with claim 1 wherein said mounting frame securable to a surface is secured by threaded fasteners, adhesive, or magnetic force.

* * * * *